Feb. 21, 1956  P. H. SEWARD  2,735,972
WHEEL SLIP CONTROL
Filed Sept. 13, 1951
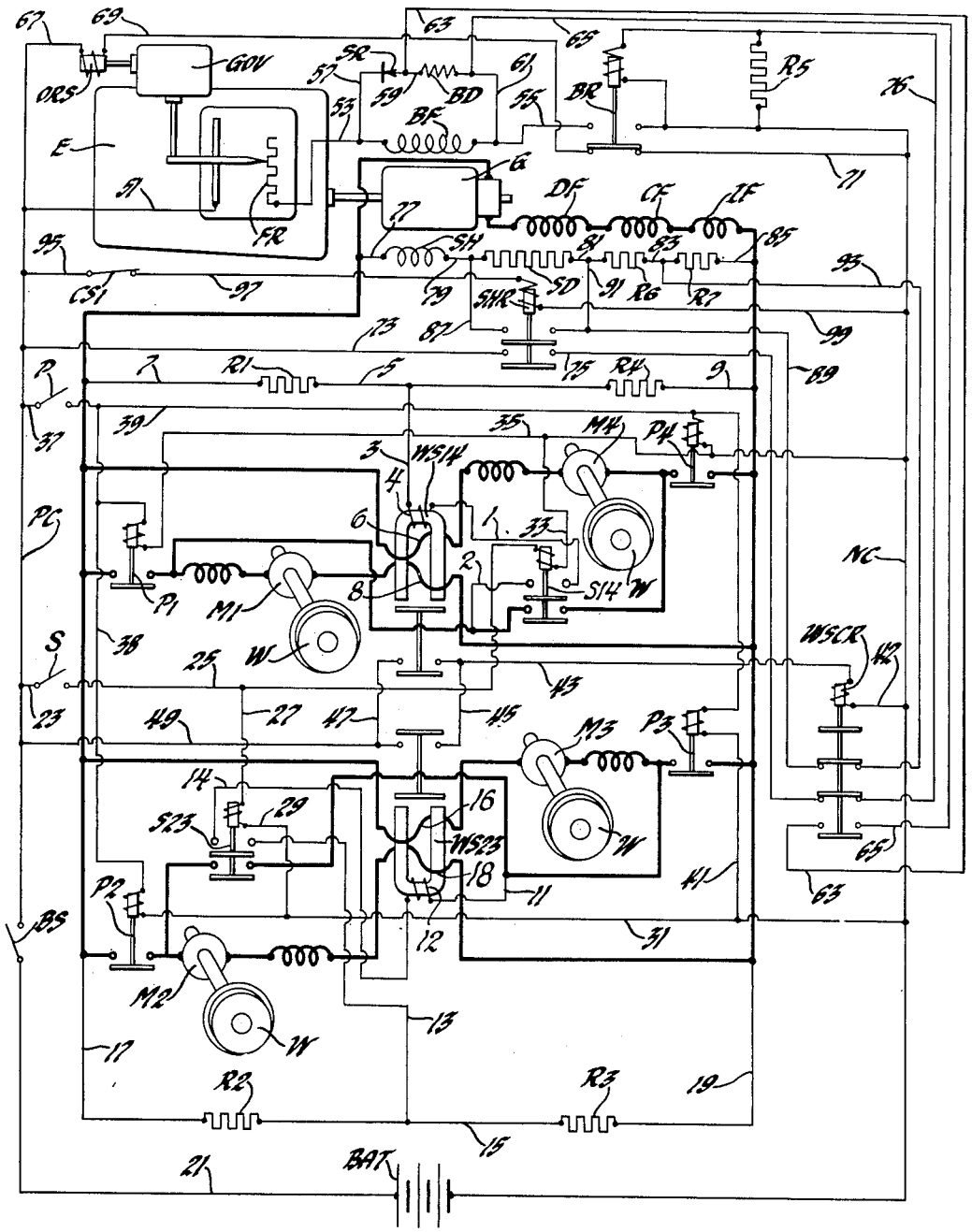
Inventor
Paul H. Seward
By Willits, Helmig & Baillio
Attorneys United States Patent Office 2,735,972
Patented Feb. 21, 1956

2,735,972

WHEEL SLIP CONTROL

Paul H. Seward, Downers Grove, Ill., assignor to General Motors Corporation, Detroit, Mich., a corporation of Delaware Application September 13, 1951, Serial No. 246,369

10 Claims. (Cl. 318—52)

This invention generally relates to generating electric traction and control systems for locomotives and more particularly to traction wheel-slip control systems.

Conventional methods of wheel slip control systems consist of discharging the field windings of the generator supplying power to the traction motors driving separate traction wheels upon slippage of a traction wheel by a wheel slip relay acting in response to unbalanced electrical conditions in the traction motor circuit upon wheel slippage. This results in a drastic and prolonged interruption in power supplied to the motors and a corresponding prolonged interruption in the motor torque and acceleration of the locomotive and train hauled thereby. Also upon reexcitation of the generator field windings and power output to the original value at which wheel slippage occurred usually causes recurrence of wheel slippage unless the locomotive engineer reduces the power output of the locomotive power plant.

The principal object of the present invention is to control and limit wheel slippage without attention on the part of the locomotive engineer by the provision of automatic power plant control means to control the power output to the motors during and after wheel slippage to preclude sudden and prolonged changes in speed, load and output of the power plant and torque of the motors and therefore only a slight reduction in tractive effort of the locomotive occurs under any rail condition.

The combined generating electric traction and control system by which this object is accomplished together with other novel features embodied therein will become apparent by reference to following detail description and single accompanying, schematic drawing illustrating the novel features of this invention.

As illustrated in the drawing the locomotive traction and control system includes a power plant including a prime mover E of the diesel type and a compound electric generator G shown directly connected to and driven thereby. The power plant supplies power to four series type electric traction motors, M1, M2, M3 and M4, each shown operatively connected to a separate traction wheel W of the locomotive in conventional manner. Power is supplied by power line conductors, shown in heavy lines extending from the opposite terminals of the generator G and by separate motor branch circuit connections, also shown in heavy lines, extending between the power lines and serving to connect each motor in series with the normally open contacts of a separate parallel contactor across the power line. The separate motor parallel contactors are indicated by the reference characters P1, P2, P3 and P4 for the respective traction motors M1, M2, M3 and M4.

The separate motor branch circuit connections for the motors M1 and M4 are shown including windings 6, 8 extending in opposite directions between the poles of a U-shaped magnetizable yoke of a wheel slip relay WS14 for the motors M1 and M4. The separate motor branch circuit connections for the motors M2 and M3 are also shown including windings 16, 18 extending in opposite directions between the poles of a U-shaped magnetizable yoke of another wheel slip relay WS23 for the motors M2 and M3. A separate series branch circuit connection, shown in heavy lines and including the lower set of normally open contacts of a series contactor S14 is connected between the motors M1 and M4 and another separate series branch circuit connection, shown in heavy lines and including the lower set of normally open contacts of another series contactor S23 is connected between the motors M2 and M3.

A winding 4 is also shown provided on the yoke of wheel slip relay WS14. One terminal of the winding 4 of the wheel slip relay WS14 is connected by a conductor 1, the upper set of normally open interlocks of series contactor S14, and a conductor 2 to the series branch connection between the motors M1 and M4, and the other winding terminal is connected by a conductor 3 to a common conductor 5 connected between the resistors R1 and R4 of equal resistance value which are connected in series across the power line by conductors 5, 7 and 9. Similarly, one winding terminal of a winding 12 on the wheel slip relay WS23 is connected by a conductor 11 to the series branch connection between the motors M2 and M3 and the other winding terminal is connected by a conductor 14, the upper set of normally open interlocks of series contactor S23, and a conductor 13 to a common conductor 15 connected between the resistors R2 and R3 of equal resistance value which are likewise connected in series across the power line by conductors 15, 17 and 19.

Each of the parallel and series contactors P1, P2, P3, P4, S14 and S23 is provided with an electrical winding which, when energized from a battery BAT, causes closure of the normally open contacts of the contactor.

A battery switch BS is connected in series between a positive control conductor PC and a conductor 21 connected to the positive terminal of the battery BAT and a negative control conductor NC is connected to the negative battery terminal.

A series starting control switch S is connected between the positive control conductor PC and one winding terminal of each of the series contactors S14 and S23 by conductors 23, 25 and 27 and the opposite winding terminals of the contactors S14 and S23 are connected by conductors 29, 31, 33 and 35 to the negative control conductor NC to energize the windings and cause closure of upper and lower contacts of the series contactors S14 and S23 to connect each pair of motors in series across the power line to establish the series-parallel starting power circuit motor connection with the power plant generator G upon closure of the series control switch S. With the motors M1 and M4 connected in series across the power line both terminals of the winding 4 of the wheel slip relay WS14 are in equipotential relation with the power line between the resistors R1 and R2 and motors M1 and M4, as long as balanced electrical conditions exist between the motors M1 and M4 and no current will flow in the wheel slip relay winding 4. A slight increase in speed and back voltage of one of the motors M1 or M4 driving a separate locomotive traction wheel W upon slippage of the wheel will cause an unbalance in the electrical conditions between the motors M1 and M4 to cause energization of the winding 4 and closure of the contacts of the wheel slip relay WS14. Similarly when the motors M2 and M3 connected in series across the power line of both terminals of the winding 12 of the wheel slip relay WS23 are in equipotential relation with the motors M2 and M3 and the power line, as long as balanced electrical conditions exist between the motors M2 and M3 no current will flow in the winding 12 of the wheel slip relay WS23. A slight increase in speed and back voltage of one of the motors M2 or M3 driving a separate locomotive traction wheel upon slippage of the wheel will also cause an unbalance in the electrical conditions between the motors M2 and M3 and cause energization of the winding 12 and closure of the contacts of the wheel slip relay WS23.

A parallel control switch P is connected in series between the positive control conductor PC and one winding terminal of each of the parallel contactors P1, P2, P3 and P4 by conductors 37, 38 and 39 and the opposite winding terminals of these contactors are connected to the negative control conductor NC by conductors 31, 35 and 41 to energize these windings and cause closure of the contacts of these contactors to connect each of the motors M1, M2, M3 and M4 across the power line and establish a high speed parallel running traction motor power connection with the power plant generator upon closure of the parallel control switch P and opening of the series switch S to deenergize the windings of series contactors S14 and S23.

Closure of the contacts of either of the wheel slip relays WS14 and WS23 causes energization of the winding and the opening of two normally closed sets and the closing of a normally open set of contacts of a wheel slip control relay WSCR provided to control the power output of the power plant upon slippage of any locomotive traction wheel when the motors are connected in either series-parallel or parallel power circuit relation with the power plant generator G.

One winding terminal of the wheel slip control relay WSCR is connected by a conductor 42 to the negative control conductor NC and the opposite winding terminal is connected to one contact of each of the wheel slip relays WS14 and WS23 by conductors 43 and 45. The other contacts of the wheel slip relays WS14 and WS23 are connected by conductors 47 and 49 to the positive control conductor PC.

The speed, load and output controlling means for the power plant includes a conventional engine driven governor GOV having a hydraulic servo mechanism operating the diesel engine fuel regulator, not shown, and a field rheostat FR for a battery excited field winding BF of the generator G to maintain any one of a preselected number of substantially constant values speed, load and power output of the power plant in a well known manner. The governor GOV is also provided with conventional speed and load setting means, not shown, operable to select the particular speed, load and power output at which it is desired to have the power plant operate. The governor is also provided with an overriding solenoid ORS energizable to override the governor and cause movement of the field rheostat FR toward the maximum resistance setting and decrease the generator exctiation and power output.

In addition to the battery excited field winding BF provided for the generator G, a shunt connected field winding SH and also series connected differential, compensating and commutating field windings DF, CF and IF are provided for the generator.

The field rheostat FR and generator battery field winding are connected in series with a normally open set of contacts of a battery field relay BR between the positive and negative control conductors PC and NC by conductors 51, 53 and 55. A discharge resistor BD is connected in series with a selenium rectifier SR by conductors 57, 59 and 61 and one set of normally open contacts of the wheel slip control relay WSCR are connected in shunt relation with the discharge resistor BD by conductors 63 and 65. The battery field relay BR is provided with a set of normally closed contacts which are connected in series with the governor overriding solenoid ORS by conductors 67, 69 and 71 between the positive and negative control conductors PC and NC. One winding terminal of the battery field relay BR and one set of normally open contacts of a generator shunt field relay SHR, and one set of normally closed contacts of the wheel slip control relay WSCR are connected in series between the positive control conductor PC and this winding terminal of the battery field relay by conductors 73, 75 and 76. The other winding terminal of the battery field relay BR is connected to the negative control conductor NC and a discharge resistor R5 is connected in shunt relation with the winding of the relay BR directly between the negative control conductor NC and the conductor 76.

The generator shunt field winding SH is connected in series with a discharge resistor SD and two other resistors R6 and R7 between the generator armature terminals by conductors 77, 79, 81, 83 and 85. The other normally open contacts of the shunt field relay SHR are connected in shunt relation with the discharge resistor SD by conductors 87, 89 and 91. The remaining normally closed contacts of the wheel slip control relay WSCR are connected in shunt relation with the resistor R6 by conductors 89, 91 and 93. The winding of the shunt field relay is connected in series with a control switch CS1 between the positive and negative control conductors PC and NC by conductors 95, 97 and 99.

Starting and acceleration of the locomotive and train coupled thereto, with the engine E driving the generator G at the no load, idling speed value, is accomplished by closure of the battery switch BS, control switch CS1 and series control switch S and by increasing the speed and load setting of the governor GOV of the engine and generator power plant. The above control operations may be accomplished in conventional manner by means of a manually operable master controller, and control connections, not shown, interconnecting the controller to conventional remotely controlled power operated means, not shown, for these switches BS, CS1 and S and also to remotely controlled power operated means, not shown, for the conventional governor speed and load setting means, not shown.

Closure of the battery switch BS and series control switch S energizes the windings of the series contactors S14 and S23 through conductors 21, PC, 25, 27, 29, 31, 33, 35 and NC to cause closure of the contacts of these contactors. This connects the motors M1 and M4 in series circuit relation across the generator G and also connects the motors M2 and M3 in series circuit relation across the generator to establish a series-parallel, high torque motor starting circuit to accelerate the locomotive and train hauled thereby. Closure of the battery switch BS and control switch CS1 also energizes the governor overriding solenoid ORS through conductors 21, PC, 67, 69, 71 and NC and the normally closed set of contacts of the battery field relay BR. This causes the overriding solenoid ORS to override the governor GOV and cause movement of the field rheostat FR toward an increased resistance setting and thereby reduce the generator battery field excitation and the generator power output to the motors for starting the locomotive. Closure of the battery switch BS and control switch CS1 also energizes the winding of the generator shunt field relay SHR through conductors 21, PC, 95, 97, 99 and NC to cause closure of both sets of contacts thereof. Closure of the upper set of contacts of the shunt field relay SHR shunts the shunt field discharge resistor SD through conductors 87, 89 and 91 and the conductors 89 and 91 together with one set of normally closed contacts of the wheel slip control relay WSCR and conductors 91 and 93 also serve to shunt the resistor R6 in the generator shunt field circuit. Closure of the lower contacts of the shunt field relay SHR causes energization of the winding of the generator battery field relay BR through the other set of normally closed contacts of the wheel slip control relay WSCR and conductors 21, PC, 73, 75, 76 and NC and connects the resistor R5 between the conductors 76 and NC and in shunt relation with the winding of the battery field relay BR.

Energization of the winding of the battery field relay BR causes the opening of the lower, normally closed set of contacts of this relay to deenergize the governor overriding solenoid ORS and also causes closure of the normally open contacts of the relay BR to connect the generator battery field winding BF in series with the field rheostat FR between the positive and negative control conductors PC and NC through conductors 51, 53 and 55.

Deenergization of the governor overriding solenoid ORS causes the field rheostat FR to move back toward a reduced resistance setting and cause an increase in the battery field excitation current of the generator G. The governor GOV then controls the fuel supplied to the engine E and the field rheostat FR to maintain constant speed, load and power output of the generator G depending upon the speed and load setting of the governor. This causes an increase in the generator voltage and as the shunt field discharge resistor SD and resistor R6 are shunted out of the generator shunt field winding SH, the shunt field excitation is increased and supplements the battery field excitation. This causes an increase in current supplied by the generator G to the traction motors which are connected therewith in series-parallel starting circuit relation and an increase in motor torque to cause acceleration of the locomotive.

Upon an increase in speed of the locomotive and traction motors the back voltage of the motors will increase and reduce the generator voltage applied thereto and lower the current supplied to the motors and the torque thereof. In order to obtain an increase in motor current and speed and therefore an increase in the locomotive speed the traction motors are then connected in a high speed parallel circuit relation with the generator G by closure of the parallel control switch P and opening of series switch S. Closure of the parallel control switch P and opening of series switch S may also be accomplished by the manually operable master controller and control connections, not shown, to remotely controlled power operated means for operating these switches by means acting in response to electrical conditions in the series-parallel motor circuit for causing transition between the series-parallel starting and the parallel high speed running motor circuit connections in a well known manner.

As previously explained with each pair of traction motors connected in series across the generator G and in high torque, series-parallel starting circuit relation therewith and operating at equal speed with no traction wheel slippage, no current will flow in windings 4 or 12 on the yokes of wheel slip relays WS14 and WS23 and the contacts thereof will remain in the normal position shown.

With the motors connected in high speed, parallel running circuit relation with the generator G and no slippage of the traction wheels there will be equal current flow through each of the separate motor, parallel branch circuit connections. As previously mentioned, each pair of separate parallel motor connections include windings 6, 8 and 16, 18 which extend through the poles of the yoke of their associated wheel slip relay in opposite directions between the power line conductors and each pair of separate motor branch connections is accordingly in equal differential current flow and therefore their windings 6, 8 and 16, 18 in equal differential flux interlinkage relationship with each of these yokes and the contacts of the wheel slip relays WS14 and WS23 will also remain in the normal open position, as shown.

During the acceleration of the locomotive, with the traction motors connected in the series-parallel, high torque, starting circuit relation, should one traction wheel W slip driven by either motor of each series connected pair of motors, unbalanced electrical conditions will occur between a pair of motors and the windings 4 or 12 of one or the other of the wheel slip relays WS14 or WS23 will be energized by the unbalanced circulating current between a pair of series connected motors and this will cause closure of the contact of one or the other of these wheel slip relays. This causes the energization of the winding of the wheel slip control relay WSCR through the closed contacts of one of the wheel slip relays WS14 or WS23, and conductors PC, 49, 45, 43 and NC. This causes closure of the lower normally open contacts and the opening of both sets of the normally closed contacts of the wheel slip control relay WSCR.

The opening of the set of contacts of the wheel slip control relay WSCR, connected in series with the winding of the battery field relay BR, deenergizes this winding having the discharge resistor R5 connected in shunt relation therewith to delay the decay of flux from this winding and delay the opening of the upper contacts thereof, causing the deenergization of the generator battery field winding BF and to also prevent arcing of the contacts of the wheel slip control relay upon the opening thereof and to also delay closure of the lower contacts of the relay BR causing energization of the governor overriding solenoid ORS which causes movement of the field rheostat FR toward the increased resistance setting position and therefore a decreased excitation current setting.

The opening of the other set of contacts of the wheel slip control relay WSCR shunting the resistor R6 in the generator shunt field circuit, inserts the resistor R6 in series with the resistor R7 already in this generator field circuit to increase the resistance therein and decrease the excitation current therein and thereby decrease the power supplied to the traction motors by the generator G.

The closure of the other set of contacts of the wheel slip control relay WSCR, connected in shunt relation with the battery field discharge resistor BD, shunts this resistor, and upon delayed opening of the upper contacts of the battery field relay BR, batter field discharge current will circulate through the selenium rectifier SR, and these closed contacts of the wheel slip control relay WSCR to control decay of flux in the battery field winding and cause a controlled rate of decrease in the generator output along with the reduction in generator output resulting from the insertion of the resistor R6 in the generator shunt field circuit. As the generator output to the traction motors decreases at a controlled rate, traction motor wheel slip will stop and the closed contacts of either of the wheel slip relays WS14 and WS23 will return to the normally open position to cause deenergization of the winding of the wheel slip control relay WSCR and the return of the contacts thereof to the normal position. This opens the shunt circuit around the battery field discharge resistor BD, causes closure of the contacts in the circuit for shorting resistor R6 out of the generator shunt field circuit and causes reenergization of the winding of the battery field relay BR. This causes deenergization of the governor overriding solenoid and reenergization of the battery field winding but at a reduced value of current from the value at which wheel slippage started and a gradual increase in the current to the value at which wheel slip started upon deenergization of the governor overriding solenoid. Deenergization of the overriding solenoid causes movement of the field rheostat FR toward the decreased resistance setting and causes a gradual increase in the generator power output to the traction motors from the reduced value at substantially the same value at which wheel slippage stopped to the original value in order to prevent recurrence of wheel slippage.

It has been found that wheel slippage is often stopped by the reduction in the shunt field excitation current upon insertion of the resistor R6 in this circuit and before discharge of the battery field winding takes place upon delayed opening of the battery field relay BR. In this case the governor overriding solenoid ORS is not energized to increase the resistance setting of the battery field rheostat FR and the wheel slip relay WS14 or WS23, and the wheel slip control relay contacts immediately resume their normal position with only a slight reduction in the generator output.

Under other rail conditions wheel slip is stopped after insertion of the resistor R6 in the shunt field circuit following discharge of the battery field winding BF and energization of the governor overriding solenoid ORS and prior to the maximum reduction in excitation current in both of these generator field circuits, in which case the generator excitation current in both of these field windings is reduced to a greater degree and is gradually returned to the original value by action of the overriding solenoid to prevent recurrence of wheel slip.

The action of the above described wheel slip control system is the same when the traction motors are connected in parallel, high speed, running circuit relation with the generator G except, that in this case, each of the wheel slip relays WS14 or WS23 act in response to an unbalance in current between a pair of parallel connected motors as the separate motor branch circuit connections are disposed in a differential flux interlinkage arrangement with the yoke of each wheel slip relay and any difference in current flow in any pair of these branch connections will cause closure of the contact of either of the wheel slip relays.

The above described wheel slip control system by controlling the rate of decrease in the generator excitation and power output upon the occurrence of wheel slippage, stops slippage during this reduction and causes a gradual return of the excitation and output to its original value without any attention on the part of the locomotive engineer, and it has been found that the output need only to be reduced 15 to 20 percent of the original value to stop wheel slip. The wheel slip time cycle is of short duration and therefore, the interruption in motor torque is of small duration, and an upsurge in the engine speed is prevented by the reduction in generator output and the generator output is increased gradually to its original value to prevent recurrence of wheel slip.

I claim:

1. In a generating electric locomotive having a plurality of traction wheels, a plurality of electric traction motors, each of said motors being connected in driving relation to a traction wheel to drive said plurality of wheels at equal speeds, a prime mover driven electric generator connected in balanced electrical power circuit relation with said plurality of traction motors when the traction wheels are driven at equal speeds thereby, said generator having power output control means normally acting to maintain the power output of the generator substantially constant and operable to successively reduce and increase the generator power output to the traction motors, electric relay control means connected in balanced electrical relation with the traction motors and operable only upon unbalanced electrical power relations between the motors upon slight slippage of any traction wheel to control operation of the generator output control means and thereby stop wheel slippage, and means operable by said electric relay control for retarding operation of said power output control means when reducing generator output to eliminate wheel slip and restoring the balanced electrical power relations between the motors to prevent further wheel slippage.

2. In a generating electric locomotive having a plurality of electric traction wheels, a plurality of electric traction motors, each of said motors being connected in equal speed driving relation with separate traction wheels, an engine driven electric generator connected in balanced electric power circuit relation with said plurality of motors when the wheels driven thereby are operating at equal speeds, said generator having power output controlling means operable to provide a successive controlled rate of reduction and increase in the generator power output to the traction motors and automatic control means for the generator power output controlling means, said automatic control means being connected to the motors and operating in response to any slight unbalance in the electrical power relations between the motors by slippage of any traction wheel to promptly check wheel slip and means to inhibit recurrence of such slippage.

3. In a generating electric locomotive having a plurality of traction wheels, a plurality of electrical traction motors, each of said motors being connected in equal driving speed relation with separate traction wheels, a motor power plant including an engine and an electric generator driven thereby, said generator being electrically connected in balanced electrical relation with said plurality of motors when driving said separate traction wheels at equal speeds, said generator having a plurality of electric excitation means one of which is connected to a separate voltage source, each of said excitation means including excitation current varying means, said plurality of excitation current varying means including means temporarily tending to maintain current through one of said excitation means after one of said excitation means is disconnected from said voltage source, said excitation varying means being operable to provide a sequential controlled rate of reduction and increase in the generator power output to the traction motors and therefore sequential controlled rate of reduction and increase in the driving force exerted on said separate motor driven traction wheels to control slippage of any of said separate motor driven traction wheels, and wheel slip responsive control means connected in controlling relation to said plurality of generator excitation current varying means and connected to the motors to act automatically in response to any unbalance in electrical relation therebetween to control operation of said plurality of generator excitation current varying means and thereby control wheel slippage.

4. In a generating electric locomotive having a plurality of traction wheels, a plurality of electric traction motors, each of said motors being connected in driving relation to drive separate traction wheels at equal speeds, a power plant including a prime mover and an electric generator driven thereby, said generator being connected in balanced electrical relation with said plurality of traction motors when driving the traction wheels at equal speeds and having at least one excitation circuit, said excitation circuit including a generator field winding, a field discharge relay, a rheostat connected to said field winding to vary the excitation current therein, a discharge resistor and rectifier connected across said field winding to control the flow of discharge excitation current, shunt means in circuit with said rectifier and said winding and operable upon wheel slip to shunt said discharge resistor and temporarily allow current flow to continue through said winding after said winding has been disconnected from its energizing circuit by said field discharge relay to delay decay of flux in said winding upon discharge thereof and thereby provide a controlled rate of reduction in the power output to the motors and load on said engine to check slippage of any traction wheel and to prevent a sudden increase in engine speed, rheostat operating means, control means for said rheostat, operating means to adjust said rheostat to successively reduce and increase the excitation current in said generator field winding and thereby reduce and increase the generator output, and control relay means connected to said motors and operable upon an unbalance in electrical conditions between the motors to control operation of said field discharge relay and rheostat operating means.

5. In a generating electric locomotive having a plurality of traction wheels, a plurality of electric traction motors, each of said motors being connected in driving relation to separate traction wheels to drive said plurality of wheels at equal speeds, a power plant including a prime mover and an electric generator driven thereby, said generator being connected in balanced electrical relation with the motors when driving the traction wheels at equal speeds and having at least one excitation circuit including a field winding, an energizing source for said field winding, field winding discharge means operable to control the rate of decay of flux in said winding and a field rheostat, said field discharge means including a discharge resistor and shunt means to shunt said discharge resistor after said winding has been disconnected from its energizing source, a governor driven by the power plant to operate the field rheostat, governor overriding means operable to overcome the governor and reduce the excitation current setting of said field rheostat, and electrical control means connected in balanced electrical relation with said traction motors and operable upon unbalanced electrical conditions therebetween upon slippage of any wheel to connect said shunt means directly across said winding to allow current to flow around said discharge resistor and through said winding, said electrical control means acting to control operation of said governor overriding means and said field discharge means to successively reduce and increase the generator excitation and thereby successively decrease and increase the generator power output to the motors and load on the engine momentarily to check any wheel slippage and prevent sudden changes in engine speed and thereby prevent recurrence of wheel slippage.

6. In a generating electric locomotive having a plurality of traction wheels, a plurality of electric traction motors, each of said motors being connected in driving relation to separate traction wheels to drive said plurality of wheels at equal speeds, a power plant including an engine and an electric generator driven thereby, said generator being connected in balanced electrical relation with said plurality of traction motors when the wheels driven thereby are operating at equal speeds and having at least one excitation circuit including a field winding, a field rheostat, a field discharge relay and a discharge resistor and rectifier connected across said field winding to vary the generator excitation and power output and therefore the load on the prime mover, a shunt circuit including said rectifier adapted upon wheel slip to be connected directly across said winding to allow current flowing in said winding to shunt said discharge resistor, a governor driven by the engine to operate the field rheostat and maintain the generator power output and load on the engine substantially constant, governor overriding means operable to overcome the governor and move the rheostat toward a reduced excitation current setting, and relay control means operable in response to unbalanced electrical relations between the motors upon slippage of any wheel to connect said shunt circuit directly across said winding to shunt the discharge resistor and control operation of the governor overriding means to check wheel slippage by successively reducing and increasing the generator power output to the motors.

7. In a generating electric locomotive having traction wheels, electric traction motors, each motor driving a separate traction wheel to cause operation of said wheels at equal speeds, a power plant including a prime mover and an electrical generator, said generator being connected in balanced electrical relation with said motors when operating at equal speeds, said generator having an excitation system comprising at least two cooperating excitation circuits, one of said circuits including a voltage source, a field winding, a field control rheostat, a field discharge relay and a field discharge resistor and rectifier connected to said field winding to cause a controlled rate of reduction in the flux in said winding, said other excitation circuit including a second generator field winding and a field resistor, a shunt circuit including said rectifier and adapted to be connected directly across said first mentioned field winding, a governor driven by the power plant and operatively connected to said rheostat to vary the setting thereof, governor overriding means to adjust the rheostat to a reduced excitation setting, and relay control means to shunt out a portion of said field resistor and operable to insert said field resistor in series with said second generator field winding, said relay control means acting to connect said shunt circuit across said first mentioned field winding to shunt said discharge resistor, said relay control means acting to control operation of said discharge relay to disconnect said first field winding from said voltage source, and relay control means acting to energize said governor overriding means, said relay control means being connected to the motors and acting automatically in response to any unbalance in electrical conditions therebetween to reduce the generator output and check wheel slippage and thereby cause a controlled increase in the generator output to its original value.

8. In a generating electric locomotive having traction wheels, electric traction motors driving separate traction wheels at equal speeds, a power plant including an engine and an electric generator, said generator being connected in balanced electrical circuit relation with said motors when the wheels are driven at equal speeds thereby, and having first and second exciting field circuits acting in combination to control the generator power output to the motors and load on the engine, said first excitating field circuit including a first field winding having an energizing source, a field discharge relay, a control rheostat and a discharge resistor and rectifier connected across said first field winding, and a shunt circuit including said rectifier and adapted to directly connect the terminals of said first field winding, said second exciting field circuit including a second field winding and resistance means to limit the current therein, an engine driven governor for controlling the engine speed and to operate said rheostat to maintain the engine speed and generator power output and load substantially constant, governor overriding means to move said rheostat to a reduced excitation setting, means to connect said field discharge relay in controlling relation with said governor overriding means, time delay means to delay action of said field discharge relay, and control relay means normally acting to shunt a portion of said resistance means, said control relay means being connected to said motors and acting upon unbalanced electrical relations therebetween by differences in speed thereof to simultaneously shunt said discharge resistor, insert all of said resistance means in said second generator exciting field circuit, operate said discharge relay to disconnect said first field winding from its energizing source to thereby provide a controlled rate of reduction in power output to the motors and load of the engine to stop wheel slippage and thereby cause a controlled rate of increase in the generator power output to the original position to prevent further wheel slippage.

9. In a generating electric locomotive having traction wheels, electric traction motors, each motor being connected to separate traction wheels to drive said wheels at equal speeds, an engine, an electric generator driven by the engine, electric power connections including switching means to connect said motors in electrically balanced series and parallel circuit relations with said generator, said generator having shunt and separately excited excitation circuits cooperating to control the generator power output, said separately excited excitation circuit including an exciting winding, a voltage source, an adjustable rheostat, a discharge relay having a winding, a discharge resistor and rectifier connected across said exciting winding, and a shunt circuit including said rectifier and adapted to directly connect the terminals of said exciting winding, a second discharge resistor connected across the discharge relay winding to delay discharge action thereof and discharge of said separately excited generator exciting winding, said shunt excitation circuit including a shunt exciting winding, resistance means, and a shunting relay normally shunting a portion of said resistance means and acting to insert said shunted resistance portion, a governor driven by said engine and operatively connected to said rheostat to control the engine speed and current in said separately excited excitation circuit and thereby maintain the engine speed and generator output and load substantially constant, governor overriding means connected in controlled relation with said discharge relay and operable upon delayed action thereof, and control relay means connected in balanced electrical relation with said power connections to act automatically upon any electrical unbalance between the motors when connected in series or parallel circuit relation to control delayed discharge of said discharge relay and action of said shunting relay to cause a sequential controlled decrease and increase in the generator excitation and power output upon slippage of any traction wheel to stop wheel slippage and to inhibit recurrence thereof, said control relay means acting to complete said shunt circuit to shunt said discharge resistor thereby temporarily continuing current flow through said separately excited winding after said discharge relay has been deenergized to disconnect said separately excited winding from said voltage source.

10. A wheel slip control system for a vehicle having a plurality of traction wheels operatively connected to a plurality of electric traction motors and adapted to be turned thereby, said system comprising a generator having excitation means therefor, said generator being connected in balanced electrical relation with said plurality of traction motors when the wheels turned thereby are operating at equal speeds, said excitation means including a field winding in electrical circuit with a voltage source, shunt circuit means adapted to connect opposite terminals of said field winding, and control means operable in response to unbalanced electrical relations between said traction motors upon slippage of one of said wheels to disconnect said winding from said voltage source, said control means being operable to complete said shunt circuit to allow current to circulate through said field winding and said shunt circuit means thereby gradually reducing the power output of said generator.

References Cited in the file of this patent
UNITED STATES PATENTS

| | | |
|---|---|---|
| 2,284,843 | Purifoy | June 2, 1942 |
| 2,516,198 | Frier | July 25, 1950 |
| 2,591,840 | Lillquist | Apr. 8, 1952 |